US012779582B2

(12) United States Patent
Flamm et al.

(10) Patent No.: US 12,779,582 B2
(45) Date of Patent: Nov. 3, 2026

(54) SYSTEM FOR PROCESSING A MATERIAL BY MEANS OF ULTRASHORT LASER PULSES

(71) Applicant: TRUMPF Laser-und Systemtechnik GmbH, Ditzingen (DE)

(72) Inventors: Daniel Flamm, Ludwigsburg (DE); Jonas Kleiner, Leonberg (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 729 days.

(21) Appl. No.: 18/331,204

(22) Filed: Jun. 8, 2023

(65) Prior Publication Data

US 2024/0066629 A1 Feb. 29, 2024

Related U.S. Application Data

(63) Continuation of application No. PCT/EP2021/079548, filed on Oct. 25, 2021.

(30) Foreign Application Priority Data

Dec. 8, 2020 (DE) ..................... 10 2020 132 688.2

(51) Int. Cl.

*B23K 26/06* (2014.01)
*B23K 26/0622* (2014.01)
*B23K 26/064* (2014.01)

(52) U.S. Cl.

CPC ...... *B23K 26/0665* (2013.01); *B23K 26/0624* (2015.10); *B23K 26/0648* (2013.01)

(58) Field of Classification Search

CPC .. B23K 26/50; B23K 26/064; B23K 26/0622; B23K 26/0648; B23K 26/0624; B23K 26/0665

See application file for complete search history.

(56) References Cited

U.S. PATENT DOCUMENTS

2011/0110627 A1 5/2011 Tsai
2014/0204387 A1* 7/2014 Narayanan .......... H01S 3/10023 356/461

(Continued)

FOREIGN PATENT DOCUMENTS

CN 102476238 A 5/2012
CN 110221445 A 9/2019

(Continued)

OTHER PUBLICATIONS

Machine Translation of Li (CN 111922512A) (Year: 2020).*

*Primary Examiner* — Brian W Jennison
(74) *Attorney, Agent, or Firm* — LEYDIG, VOIT & MAYER, LTD.

(57) ABSTRACT

A system includes an ultrashort pulse laser for providing a laser beam, a hollow core fiber, an input coupling optical unit configured to input couple the laser beam into the hollow core fiber, a lens device on which an output coupled laser beam from the hollow core fiber is incident, a beam shaping element on which the laser beam emerging from the lens device is incident, and a focusing optical unit. The lens device is configured to adjust a divergence angle of the output coupled laser beam for adjusting a beam diameter of the laser beam on the beam shaping element. The beam shaping element is configured to impose upon the laser beam a quasi-non-diffractive beam shape with a focal zone that is elongated in the beam propagation direction. The focusing optical unit is configured to set a penetration depth of the focal zone in or on the material.

14 Claims, 10 Drawing Sheets

(56) References Cited

U.S. PATENT DOCUMENTS

| | | | | |
|---|---|---|---|---|
| 2017/0176672 | A1* | 6/2017 | Kayander | G02B 6/2713 |
| 2017/0189991 | A1* | 7/2017 | Gollier | G02B 7/10 |
| 2019/0129093 | A1 | 5/2019 | Li et al. | |
| 2019/0366481 | A1 | 12/2019 | Coulaud et al. | |
| 2021/0299784 | A1 | 9/2021 | Baumann et al. | |

FOREIGN PATENT DOCUMENTS

| | | | |
|---|---|---|---|
| CN | 111922512 | A | 11/2020 |
| DE | 102017124546 | A1 | 4/2019 |
| DE | 102018201525 | A1 | 7/2019 |
| EP | 3136143 | A1 | 3/2017 |
| EP | 3169477 | A2 | 5/2017 |
| FR | 2961731 | A1 | 12/2011 |
| FR | 3061963 | A1 | 7/2018 |
| JP | 2006010961 | A | 1/2006 |
| KR | 2015106676 | A | 9/2015 |
| WO | WO 2020011315 | A1 | 1/2020 |
| WO | WO 2022122237 | A1 | 6/2022 |

* cited by examiner 62
8
81
32
42
4
α
D
x1 = f1

81'
8
D'
X1'=f1'
xG

SYSTEM FOR PROCESSING A MATERIAL BY MEANS OF ULTRASHORT LASER PULSES

CROSS REFERENCE TO RELATED APPLICATIONS

This application is a continuation of International Application No. PCT/EP2021/079548 (WO 2022/122237 A1), filed on Oct. 25, 2021, and claims benefit to German Patent Application No. DE 10 2020 132 688.2, filed on Dec. 8, 2020. The aforementioned applications are hereby incorporated by reference herein.

FIELD

Embodiments of the present invention relate to a system for processing a material by means of ultrashort laser pulses from an ultrashort pulse laser.

BACKGROUND

In the field of laser micro processing, new fields of application such as the separation of transparent materials and the welding of a plurality of transparent materials or transparent and opaque materials were able to be developed in recent years as a result of higher mean laser powers, shorter laser pulse durations, and optimized laser beam shaping. In particular, quasi-non-diffractive laser beams, such as Bessel beams, are of interest here for this type of material processing on account of their focal zone which is elongated in the beam propagation direction and on account of the advantages resulting therefrom, such as a large focal position tolerance.

EP3169477 proposes the use of a collimated laser beam for the purpose of processing a material, wherein the length of the focal zone of a Bessel beam is set by adjusting the diameter of the collimated laser beam on a beam shaping element.

Until now, the link of the frequently stationary laser source to the processing optical unit or beam shaping optical unit has been realized by way of free beam guidance by means of mirrors and lenses. However, this requires a complicated optical adjustment, and a stabilization of the position or angles of the optical elements in relation to one another. The components for the free beam guidance, however, are susceptible to contamination, manufacturing inaccuracies, the action of temperature, and assembly errors, which are reflected in a deterioration of the beam quality of the laser beam and hence in a deterioration of the material processing. Moreover, precise specification of the position of the laser beam or of the divergence of the laser beam and of the beam diameter is not possible or rendered difficult. This makes a well-defined illumination of the beam shaping element more difficult.

SUMMARY

Embodiments of the present invention provide a system for processing a material by using ultrashort laser pulses from an ultrashort pulse laser. The system includes an ultrashort pulse laser for producing the ultrashort laser pulses and for providing a laser beam, a hollow core fiber configured to transport the laser beam to an output of the hollow core fiber, and an input coupling optical unit configured to input couple the laser beam into an input of the hollow core fiber. The output of the hollow core fiber is configured to output couple the laser beam from the hollow core fiber. The output coupled laser beam subtends a divergence angle. The system further includes a lens device, on which the laser beam subtending the divergence angle and output coupled from the hollow core fiber is incident. The system further includes a beam shaping element, on which the laser beam emerging from the lens device is incident, and a focusing optical unit. The lens device is configured to adjust the divergence angle of the output coupled laser beam for adjusting a beam diameter of the laser beam on the beam shaping element. The beam shaping element is configured to impose upon the laser beam, upstream or downstream of the focusing optical unit, a quasi-non-diffractive beam shape with a focal zone that is elongated in the beam propagation direction. The focusing optical unit is configured to set a penetration depth of the focal zone in or on the material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
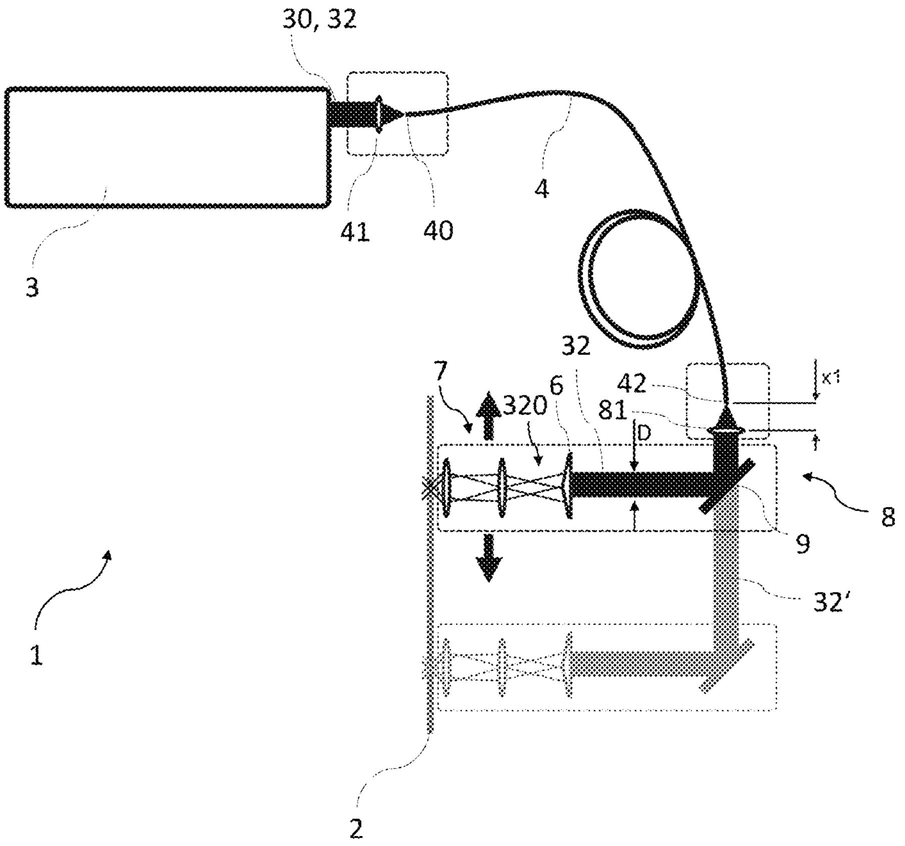
FIG. 1 shows a schematic structure according to an embodiment.

Embodiments of the present invention provide a system for processing a material by means of ultrashort laser pulses from an ultrashort pulse laser. The system includes an ultrashort pulse laser for producing the ultrashort laser pulses and for providing a laser beam, a hollow core fiber configured to transport the laser beam to an output of the hollow core fiber, and an input coupling optical unit configured to input couple the laser beam into an input of the hollow core fiber, the output of the hollow core fiber being configured to output couple, from the hollow core fiber, the laser beam which subtends a divergence angle, a lens device, on which the laser beam subtending the divergence angle and output coupled from the hollow core fiber is incident, a beam shaping element, on which the laser beam emerging from the lens device is incident, and a focusing optical unit being provided, the lens device being configured to adjust the divergence angle of the output coupled laser beam for the purpose of adjusting the beam diameter of the laser beam on the beam shaping element, the beam shaping element being configured to impose upon the laser beam, upstream or downstream of the focusing optical unit, a quasi-non-diffractive beam shape with a focal zone which is elongated in the beam propagation direction, and the focusing optical unit being configured to set the penetration depth of the focal zone in or on the material.

The material can be a metal or a semiconductor or an insulator, or a combination thereof. In particular, this may also be a glass, a glass ceramic, a polymer, or a semiconductor wafer, for example a silicon wafer.

The ultrashort pulse laser in this case makes ultrashort laser pulses available. In this context, ultrashort may mean that the pulse length is for example between 500 picoseconds and 1 femtosecond, in particular between 100 picoseconds and 10 femtoseconds. The ultrashort pulse laser may also make available bursts composed of ultrashort laser pulses, each burst comprising the emission of a plurality of laser pulses. In this case, the time interval between the laser pulses can be between 10 picoseconds and 500 nanoseconds, in particular between 10 nanoseconds and 80 nanoseconds. A temporally shaped pulse which has a significant change in amplitude within a range of between 50 femtoseconds and 5 picoseconds is also considered to be an ultrashort laser pulse. The term pulse or laser pulse is used repeatedly hereinafter. This also includes laser pulse trains, comprising a plurality of laser pulses and temporally shaped laser pulses, even if this is not explicitly stated in each case. The ultrashort laser pulses emitted by the ultrashort pulse laser accordingly form a laser beam.

Hollow core fibers are optical fibers which are formed as photonic crystal fibers with a hollow core (hollow core photonic crystal fiber—HC-PCF). The principles of optical fibers are described for example in Benabid, Fetah "Hollow-core photonic bandgap fibre: new light guidance for new science and technology." *Philosophical Transactions of the Royal Society A: Mathematical, Physical and Engineering Sciences* 364.1849 (2006): 3439-3462.

An optical fiber can be in the form of a photonic band gap fiber or, preferably, as an antiresonant fiber (antiresonant coupling fiber). In particular, an optical fiber can be in the form of a tubular fiber. Alternatively, the optical fiber can be in the form of an inhibited coupling fiber, in particular a Kagomé fiber. Hollow core fibers are suitable in particular for guiding ultrashort pulses, hence for ultrashort pulse applications.

The use of a hollow core fiber is advantageous in that the laser beam can be flexibly guided from the stationary laser to the beam shaping element, with the hollow core fiber providing a well-defined interface, by means of which the divergence angle and the beam position may be determined. In particular, the beam quality of the laser beam can be maintained by the use of a hollow core fiber.

The input coupling optical unit is an arrangement which may comprise one or more optical elements, in particular lenses and/or mirrors, and which takes on the task of imaging the laser beam provided by the ultrashort pulse laser into the hollow core fiber. To this end, the laser beam of the ultrashort pulse laser may be focused on the input of the hollow core fiber, for example. In this case, the input coupling optical unit may have an exit pupil whose diameter may be of the order of the diameter of the hollow core fiber. This allows the laser energy of the laser beam to be input coupled as completely as possible into the hollow core fiber, and consequently be transported through the hollow core fiber to the output of the hollow core fiber.

At the output of the hollow core fiber, the laser beam subtends a divergence angle when emerging from the hollow core fiber. In this case, the divergence angle may be determined by the optical properties of the hollow core fiber. In particular, the divergence angle may be fixedly specified for the respective hollow core fiber.

The laser beam subsequently illuminates a lens arrangement on which the laser beam subtending the divergence angle and output coupled from the hollow core fiber is incident. In this case, the lens device is configured to adjust the divergence angle of the output coupled laser beam for the purpose of adjusting the beam diameter of the laser beam on the beam shaping element.

The lens arrangement may comprise one or more lenses to this end. The lens arrangement may also comprise an appropriately shaped surface of the beam shaping element or a diffractive microstructure on a surface and/or in the volume of the beam shaping element. In this case, the lens arrangement is ultimately configured to influence the beam diameter of the laser beam upon entrance into the beam shaping element. Finally, the focal length of the focal zone can be influenced by varying the beam diameter of the laser beam entering the beam shaping element.

The laser beam adjusted in terms of its beam diameter by means of the lens arrangement then, having the beam diameter, enters a beam shaping element which is arranged at an overall distance from the output of the hollow core fiber, with the beam shaping element imposing on the laser beam an intensity distribution in the beam propagation direction and perpendicular to the beam propagation direction. The totality of the intensity characteristics is described using a beam profile. In particular, the shape of the imposed beam profile depends on the manner of the illumination, for example the illuminance, or else on the diameter of the laser beam on the beam shaping element, with the result that the shape of the imposed beam profile can be adjusted by adjusting the overall distance.

In particular, what are known as non-diffractive beams can be produced by the beam shaping element. Non-diffractive beams satisfy the Helmholtz equation:

$$\nabla^2 U(x,y,z)+k^2 U(x,y,z)=0$$

and have a clear separability into a transverse and a longitudinal dependence of the form $$U(x,y,z)=U_t(x,y)\exp(ik_z z)$$

In this case, $k=\omega/c$ is the wave vector with its transverse and longitudinal components $k^2=k_z^2+k_t^2$, and $U_t(x,y)$ is any complex-valued function that is dependent only on the transverse coordinates x, y. The z-dependence in the beam propagation direction in U(x,y,z) leads to a pure phase modulation, with the result that the associated intensity I of the solution is propagation-invariant or non-diffractive:

$$I(x,y,z)=|U(x,y,z)|^2=I(x,y)$$

This approach provides different classes of solutions in different coordinate systems, for example Mathieu beams in elliptic-cylindrical coordinates or Bessel beams in circular-cylindrical coordinates.

Experimentally it is possible to realize a multiplicity of non-diffractive beams in a good approximation, which is to say quasi-non-diffractive beams. In contrast to the theoretical construct, these merely carry finite power. Just as finite is the length L of the propagation invariance of these quasi-non-diffractive beams.

On the basis of the standard for laser beam characterization ISO 11146 1-3, the beam diameter is determined by way of what are known as 2nd moments. In this case, the power of the laser beam or the 0th order moment is defined as:

$$P=\int dx\, dy\, I(x,y).$$

The spatial 1st order moments specify the centroid of the intensity distribution and are defined as:

$$\langle x\rangle = \frac{1}{P}\int dxdyxI(x, y),$$
$$\langle y\rangle = \frac{1}{P}\int dxdyyI(x, y).$$

On the basis of the equations above, it is possible to calculate the spatial moments of the 2nd order of the transverse intensity distribution:

$$\langle x^2\rangle = \frac{1}{P}\int dxdy(x-\langle x\rangle)^2 I(x, y),$$
$$\langle y^2\rangle = \frac{1}{P}\int dxdy(y-\langle y\rangle)^2 I(x, y),$$
$$\langle xy\rangle = \frac{1}{P}\int dxdy(x-\langle x\rangle)(y-\langle y\rangle)I(x, y).$$

Using the thus completely defined spatial moments of the 2nd order of the laser beam, it is possible to determine the beam diameters, or the size of the focal zone, in the principal axes. In this case, the principal axes are the directions of minimum and maximum extent of the transverse beam profile, which is to say the intensity distribution perpendicular to the beam propagation direction, and these always run orthogonal to one another. Then, the focal zone d of the laser beam arises as follows:

$$d_x = 2\sqrt{2}\left\{(\langle x^2\rangle + \langle y^2\rangle) + \gamma\left[(\langle x^2\rangle - \langle y^2\rangle)^2 + 4(\langle xy\rangle)^2\right]^{\frac{1}{2}}\right\}^{\frac{1}{2}},$$
$$d_y = 2\sqrt{2}\left\{(\langle x^2\rangle + \langle y^2\rangle) - \gamma\left[(\langle x^2\rangle - \langle y^2\rangle)^2 + 4(\langle xy\rangle)^2\right]^{\frac{1}{2}}\right\}^{\frac{1}{2}},$$

where $$\gamma = \frac{\langle x^2\rangle - \langle y^2\rangle}{|\langle x^2\rangle - \langle y^2\rangle|}.$$

In particular, a long and a short principal axis of the transverse focal zone arise due to the values $d_x$ and $d_y$.

The focal zone of a Gaussian beam is consequently defined by way of the 2nd moments of the beam. In particular, this yields the size of the transverse focal zone $d^{GF}_{x,y}$ and the longitudinal extent of the focal zone, the Rayleigh length $z_R$. The Rayleigh length $z_R$ is given by $z_R=\pi(d^{GF}_{x,y})^2/4\lambda$. Starting from the position of the intensity maximum, it describes the distance along the beam propagation direction at which the area of the focal zone has increased by a factor of 2.

The focal zone of the quasi-non-diffractive beam is likewise defined by way of the 2nd moments of the beam. In particular, the focal zone emerges from the size of the transverse focal zone $d^{ND}_{x,y}$ and the longitudinal extent of the focal zone, what is known as the characteristic length L. Starting from the local intensity maximum, the characteristic length L of the quasi-non-diffractive beam is defined by way of the intensity drop to 50% along the beam propagation direction.

A quasi-non-diffractive beam is present exactly if for $d^{ND}_{x,y}\approx d^{GF}_{x,y}$, which is to say similar transverse dimensions, the characteristic length L distinctly exceeds the Rayleigh length of the associated Gaussian focus, for example if $L>10z_R$.

As a subset of the quasi-non-diffractive beams, quasi-Bessel beams or Bessel-like beams, here also referred to as Bessel beams, are known. In this case, the transverse field distribution $U_t(x,y)$ in the vicinity of the optical axis obeys to a good approximation a Bessel function of the first kind of order n. A further subset of this class of beams is the Bessel-Gaussian beams, which are widely used owing to the simple generation thereof. The illumination of an axicon in a refractive, diffractive or reflective embodiment with a collimated Gaussian beam thus enables the shaping of the Bessel-Gaussian beam. In this case, the associated transverse field distribution in the vicinity of the optical axis obeys to a good approximation a Bessel function of the first kind of the order 0, which is enveloped by a Gaussian distribution.

Accordingly, it may be advantageous to use a quasi-non-diffractive beam, in particular a Bessel beam, for processing a material since a large focal position tolerance can be achieved in this way.

Typical Bessel-Gaussian beams for processing a material have for example a transverse focal zone of $d^{ND}_{x,y}=2.5$ μm, whereas the characteristic length may be 50 μm. However, a Gaussian beam with a transverse focal zone of $d^{GF}_{x,y}=2.5$ μm only has the Rayleigh length in air of $z_R\approx 5$ μm at $\lambda=1$ μm. In these cases which are relevant for material processing, $L>>10z_R$ may apply accordingly.

In particular, the transverse focal zone of the quasi-non-diffractive beam can be non-radially symmetric.

For example, in this case non-radially symmetric means that the transverse focal zone is extended in one direction. However, a non-radially symmetric focal zone may also mean that the focal zone is, for example, cruciform or is triangular or is polygonal, for example is pentagonal. A non-radially symmetric focal zone may also comprise further rotationally symmetric and mirror-symmetric beam cross sections.

For example, there may be an elliptical focal zone perpendicular to the propagation direction, with the ellipse having a long axis dx and a short axis dy. Accordingly, an elliptical focal zone is present if the ratio $d_x/d_y$ is greater than 1, in particular if $d_x/d_y=1.5$. The elliptical focal zone of the specific beam present may correspond to an ideal mathematical ellipse. However, the specific focal zone present of the quasi-non-diffractive beam may also merely have the aforementioned ratios of long principal axis and short principal axis b, but may have a different contour—for example an approximated mathematical ellipse, a dumbbell-type shape or another symmetric or asymmetric contour enveloped by a mathematically ideal ellipse.

In particular, elliptical quasi-non-diffractive beams can be produced by way of quasi-non-diffractive beams. Here, elliptical quasi-non-diffractive beams exhibit special properties, which result from the analysis of the beam intensity. By way of example, elliptical quasi-non-diffractive beams have a principal maximum which coincides with the center of the beam. The center of the beam is in this case given by the location at which the principal axes intersect. In particular, elliptical quasi-non-diffractive beams may result from the superposition of a plurality of intensity maxima, wherein, in this case, only the envelope of the intensity maxima involved is elliptical. In particular, the individual intensity maxima do not have to have an elliptical intensity profile.

In this case, the secondary maxima which are situated nearest to the principal maximum and which result from the solution of the Helmholtz equation have a relative intensity of more than 17%. Thus, depending on the transported laser energy in the principal maximum, so much laser energy is also conducted in the secondary maxima that material processing is made possible. In addition, the nearest secondary maxima always lie on a straight line which is perpendicular to the long principal axis, or parallel to the short principal axis, and which runs through the principal maximum.

In this case, an elliptical quasi-non-diffractive beam may have a non-vanishing intensity along the long principal axis, in particular may have an interference contrast $I_{max}-I_{min}/(I_{max}+I_{min})<0.9$, such that the beam transports laser energy all the way along the long principal axis.

In this case, Imax is the maximum beam intensity along the long principal axis, while $I_{min}$ is the minimum beam intensity. If $I_{min}=0$, then complete interference occurs along the long principal axis and an interference contrast of 1 arises. If $I_{min}>0$, then only partial interference or no interference occurs along the long principal axis, with the result that the interference contrast is <1.

If, for example, the interference contrast along the long principal axis is less than 0.9, then only partial interference instead of complete interference occurs along the long principal axis and this does not lead to complete extinction of the laser intensity at the location of the intensity minimum $I_{min}$. This is for example the case if the quasi-non-diffractive beam is produced by means of a birefringent element, for example a quartz angle displacer or a quartz beam displacer or a combination thereof.

However, an elliptical quasi-non-diffractive beam may also have a vanishing intensity and an interference contrast of 1 along the long principal axis, with the result that the beam does not transport laser energy all the way along the long principal axis. This is for example the case if the quasi-non-diffractive beam is produced by means of a modified axicon.

The focusing optical unit may be an objective lens or an arrangement of lenses and/or mirrors, with the focusing optical unit focusing the quasi-non-diffractive beam into or onto the material, which is to say images said quasi-non-diffractive beam into the focus or into the focal plane. This may mean that the focus of the laser beam resulting from the focusing optical unit is located above the surface of the material, or located exactly on the surface of the material, or located within the volume of the material.

In particular, the term “focus” can be understood to mean, in general, a targeted intensity boost, with the laser energy converging in a “focal region”. In particular, hereinafter, the expression “focus” is therefore used independently of the actually used beam shape and the methods for bringing about an intensity boost. The location of the intensity boost along the beam propagation direction can also be influenced by “focusing”. By way of example, the intensity boost may have a linear embodiment, with a Bessel-type focal region arising around the focal position, as may be provided by a non-diffractive beam.

The focusing optical unit allows the laser beam to be focused accordingly along the propagation direction. During the focusing, the intensity of the laser beam is maximized toward the position of the laser focus. Accordingly, the intensity of the laser beam upstream or downstream of the position of the laser focus in the beam propagation direction is lower than at the position of the laser focus itself.

In the mathematical ideal case, the focal plane of the focusing optical unit is a plane which is perpendicular to the beam propagation direction and which preferably extends parallel to the surface of the material to be processed and in which the material is intended to be processed. However, in the practical implementation, the optical elements in the beam path lead to minor curvatures and distortions of the focal plane, with the result that the focal plane is usually curved at least locally. Moreover, the focus of the laser beam has a finite volume in which the material can be processed. Consequently, the focusing optical unit leads not to a focal plane but to an accessible focal volume in which material processing may occur. This is always considered in the context of a focus or a focal plane.

By displacing the position of the laser focus along the beam propagation direction, or by focusing, it is consequently possible to define the penetration depth of the laser beam relative to a surface of a material to be processed, with the penetration depth being given by the distance of the focal position from the surface of the material.

The beam shaping element can impose a quasi-non-diffractive beam shape on the laser beam upstream and/or downstream of the focusing optical unit. If the beam shaping element imposes a quasi-non-diffractive beam shape on the laser beam upstream of the focusing optical unit, then it is possible by way of the focusing to determine the penetration depth of the focal zone in the material. However, the beam shaping element may also be designed so that it does not produce a non-diffractive beam shape; instead, the quasi-non-diffractive beam shape only arises by imaging with the focusing optical unit.

The laser beam is at least partly absorbed by the material, with the result that the material for example is heated thermally or transitions into a temporary plasma state and evaporates, and is processed as a result. In particular, instead of linear absorption processes, it is also possible to also use non-linear absorption processes, which become accessible by the use of high laser energies.

Material processing may consist in a microstructuring of the material, for example. Microstructuring may mean that one-dimensional, two-dimensional, or three-dimensional structures or patterns or material modifications are intended to be introduced into the material, with the size of the structures typically being of the order of micrometers, or the resolution of the structures being of the order of the wavelength of the laser light used. In particular, such material processing also comprises processes known as laser drilling or laser cutting or laser polishing.

However, processing the material may also mean the separation of the material along a specific separation line.

However, processing the material may also comprise the introduction of material modifications. A material modification is a physical change in the material, said change being permanent in terms of the thermal equilibrium and causally originating from the direct laser radiation.

Here, the material modification may be a modification in the structure, in particular the crystalline structure and/or the amorphous structure and/or the mechanical structure, of the material. By way of example, an introduced material modification in an amorphous glass material may consist in the glass material obtaining an altered network structure by way of local heating only in this region. In particular, a material modification can be a local change in density, which may also depend on the selected material.

Processing the material may also be the welding of materials. In this case, the bonding partners are arranged on top of one another and the laser beam is focused on the interface arising. By fusing one or both bonding partners in the focal zone, it is possible for the arising melt to bridge the interface between the bonding partners and establish a permanent connection between the two bonding partners after cooling.

The strength of the material processing depends, inter alia, on the position of the focal zone due to the focusing optical unit. For example, the focal zone may be located in the entire volume of the material to be processed, or may be arranged on the surface. Processing may occur in the volume in the first case, while the surface may be processed in the second case.

The overall distance of the output of the hollow core fiber from the beam shaping element may be adjustable in order to set the illumination of the input of the beam shaping element and hence set the length of the elongate focal zone.

In particular, the shape of the imposed beam profile depends on the manner of the illumination, for example on the diameter of the laser beam on the beam shaping element. Consequently, the diameter of the laser beam on the beam shaping element and hence the shape of the imposed beam profile can be set by setting the overall distance.

The beam shaping element may be an axicon or a diffractive optical element, with the length of the elongated laser focal zone in the beam propagation direction being determined by the diameter of the laser beam on the input of the beam shaping element.

An axicon is a conically ground optical element which can impose a quasi-non-diffractive beam profile on a Gaussian laser beam as the latter passes through. In particular, the axicon has a cone angle $\alpha$ which is calculated from the beam entrance surface to the lateral surface of the cone.

A diffractive element likewise allows the laser beam to be spatially fanned out to a predefined geometry.

As described above, the laser beam emerges from the output of the hollow core fiber subtending a divergence angle, with the result that the diameter of the laser beam in the beam propagation direction grows or shrinks in accordance with the divergence angle. In particular, the laser beam consequently has a defined beam diameter according to the respective overall distance.

By virtue of the laser beam being incident through the beam entrance surface of the beam shaping element and penetrating into the beam shaping element, a quasi-non-diffractive beam with an elongate focal zone can be shaped from the laser beam by way of refraction and/or diffraction and/or reflection.

For example, the laser beam with the beam diameter defined by the overall distance may be incident perpendicularly on the beam entrance surface of an axicon, with the axicon having a first refractive index n1. Virtually the entire energy is transmitted into the axicon since the laser beam is incident on the planar beam entrance surface perpendicularly. However, in particular, the laser beam is not refracted on account of the perpendicular incidence.

Subsequently, the laser beam passes through the conical surface of the axicon from the medium of the axicon to the surrounding medium with a second refractive index n2, which is n2=1 for air. As a result of the cone angle, the laser beam in the axicon is incident at the (inner) interface of the axicon at an angle, with the result that the laser beam is refracted toward the optical axis. In this case, edge-remote rays need a further distance of propagation until they intersect the optical axis as edge-remote rays. This reshapes the laser beam in such a way that the laser beam downstream of the axicon has an elongate focal zone. In this case, the length of the elongate focal zone depends on the diameter of the incident laser beam, and on the refractive index of the axicon and the cone angle. This emerges approximately from Snell's law.

The beam shaping element may additionally form at least a part of the lens device and may have a further optically imaging property, for example have an at least sectionally spherically shaped side which is oriented counter to the beam propagation direction in order to influence the divergence angle of the output coupled laser beam during the passage through the beam shaping element.

As a result of the beam shaping element having a sectionally spherically shaped side, it is possible for the beam shaping element to have a lens-like effect. The lens-like effect can be influenced here by the radius of curvature of the sectionally spherically shaped side. In this case, lens-like effect means that the laser beam can be focused or scattered. This makes it possible to avoid the presence of further optical elements in the beam path between the output of the hollow core fiber and the beam shaping element.

By virtue of the sectionally spherically shaped side of the beam shaping element being oriented counter to the beam propagation direction, the side of the beam shaping element which predominantly carries out the beam shaping is oriented counter to the beam propagation direction. As a result, the laser beam firstly experiences focusing, scattering, or collimation before the laser beam is shaped. Accordingly, the laser beam diameter thus influenced can reliably affect the length of the elongate focal zone.

For the purpose of forming an optically imaging property, the beam shaping element may alternatively or additionally have a diffractive microstructure on a surface, for example of the side of the beam shaping element oriented counter to the beam propagation direction, and/or a diffractive microstructure in the volume of the beam shaping element. With the aid of the diffractive microstructure it is possible, for example, to obtain the effects specified above in relation to the spherically shaped side of the beam shaping element.

However, an optically imaging property may also consist in the beam shaping element also having the function of a phase mask. For example, a diffractive optical element may simultaneously and in combined fashion adopt the beam shaping and collimation of the laser beam. However, it is also possible for the back side of an axicon to be combined with a Fresnel lens, with such a lens being written or etched into the axicon.

However, it is also possible for an asphere or a free-form surface with one-sided structuring to be used as a beam shaping element with an optically imaging property, or for an asphere or a free-form surface to be combined with a beam shaping element to form a beam shaping element with an optically imaging property.

The lens device can be configured to set the divergence angle of the output coupled laser beam, the lens device being arranged between the output of the hollow core fiber and the input of the beam shaping element at a first distance, and the lens device comprising a first lens, the first lens having a first focal length and the first lens being positioned at a first distance from the output of the hollow core fiber, with the first distance being fixed or being able to be adjusted.

In this case, the focal length of the lens is the length on the optical axis at which a laser beam incident in parallel is focused.

The distance between the first lens of the lens device and the beam shaping element is the difference between overall distance and first distance. In this case, the first lens is positioned at a first distance from the output of the hollow core fiber in the beam propagation direction so that the first lens focuses, scatters or collimates the laser beam from the hollow core fiber. In particular, the first distance makes it possible to set whether the divergence angle of the laser beam from the hollow core fiber should be increased or decreased. However, it may also be the case that the first distance is fixedly set, with the result that the first distance cannot be set in terms of its magnitude.

This is advantageous in that the divergence angle of the laser beam downstream of the lens device can be set by way of the lens device, and in that consequently the diameter of the laser beam on the beam shaping element can be set by way of the distance between the first lens and the input of the beam shaping element, and the divergence angle.

The first lens may be a diverging lens.

What can be achieved as a result is that the divergence angle of the laser beam from the input of the hollow core fiber is increased.

In particular, what this achieves is that the laser beam already has the desired beam diameter after a relatively short propagation. In particular, this allows the installation dimensions of the optical system to be reduced.

What can be achieved as a result is that the properties of the laser beam can be optimally adapted to the optical properties of the downstream lens device.

A beam splitter optical unit configured to deflect some of the laser beam away from the beam direction may be arranged downstream of the first lens in the beam direction.

By way of example, a beam splitter optical unit can be a beam splitter cube or a beam splitter plate, with the laser beam being split into at least two component laser beams during the passage of the laser beam through the beam splitter optical unit. The two component beams may have the same intensity or different intensities, depending on the splitting ratio of the beam splitter optical unit. In particular, the beam splitter optical unit can be arranged so that merely one portion of the laser beam is deflected away from the beam direction, while the other portion continues to propagate along the original beam direction.

The deflected beam portion of the laser beam can be made accessible to at least one further beam shaping element and at least one further processing optical unit.

As a result, the laser beam made available by the ultrashort pulse laser can be split, thus allowing the processing of the material at different locations by way of the component laser beams. Alternatively, a further material or a further workpiece can be processed at the same time.

The lens device may additionally comprise a second lens and the second lens may be positioned at a second distance from the first lens downstream of the first lens in the beam direction, with the second distance being fixed or being able to be adjusted.

In particular, the second distance is measured relative to the position of the first lens, with the result that the distance of the second lens from the beam shaping element is given by the difference between the overall distance and the sum of the first and second distances.

By way of the lens device comprising a first lens and a second lens, it is possible, in particular, to produce an optical arrangement that acts like a telescope. In particular, this allows magnifying and reducing optical imaging. As a result, it is possible to precisely set the diameter of the laser beam on the beam shaping element. Moreover, a more accurate adjustment of the divergence angle of the laser beam is possible as a result of the two lenses of the lens device.

The first distance may be fixed in a preferred embodiment, with the first distance being equal to the first focal length and the laser beam being collimated by the first lens as a result, the first lens being exchanged for a further first lens with a further first focal length for the purpose of setting the diameter of the laser beam on the beam shaping element, the further first lens being arranged at a further first distance in front of the output of the hollow core fiber, the further first distance being equal to the further first focal length, and the laser beam being collimated by the further first lens as a result.

This is advantageous in that the first lens and the further first lens collimate the laser beam at the first distance and the further first distance, respectively, with the result that a defined beam diameter is obtained on the beam shaping element after the overall distance. By virtue of the first distances being fixed in each case and, in particular, consequently not being able to be adjusted, there is no need for adjustment-critical elements such as a telescope which has the option of changing the position of the lenses or has adjustable objective lenses.

By virtue of the first lenses being arranged at different distances downstream of the output of the hollow core fiber and the divergence angle of the hollow core fiber being constant, there is a variation in the beam diameter with which the laser beam is incident on the first lenses. However, by virtue of the distance of the first lenses from the hollow core fiber in each case equaling the first focal lengths, the laser beam is collimated in both cases, with the diameter of the collimated laser beam on the beam shaping element corresponding to the diameter of the laser beam on the first lenses.

In a further preferred embodiment, the first distance can be adjustable, with the divergence angle of the laser beam from the hollow core fiber being set by setting the first distance, the second distance being able to be adjustable and being set so that the focus of the second lens coincides with the point from which the laser beam with the set divergence angle appears to originate, the second lens being configured to collimate the divergent laser beam, and the diameter of the laser beam on the beam shaping element being able to be set by setting the first distance and the second distance.

In particular, the divergent laser beam from the output of the hollow core fiber is incident on the first lens after the first distance, whereby the divergence of the laser beam is altered accordingly. The second lens is attached at the distance so that the focus of the second lens is located at the point from which the laser beam for the second lens appears to originate. The distance of the second lens is accordingly matched to the divergence angle of the laser beam as a result of the first lens. If the intention is to vary the length of the focal zone, both the first distance of the first lens and the second distance of the second lens are altered.

A simple adjustment of the beam diameter on the beam shaping element can be achieved in this way.

For example, the divergence or the numerical aperture NA from the hollow core fiber can be 0.02. The first lens may have a focal length f1 of −200 mm and may be arranged at a distance of 33.7 mm from the output of the hollow core fiber. A second lens may have a focal length F2 of 150 mm and may be positioned at a distance of −121.2 mm from the first lens. Consequently, a collimated beam diameter of approximately 7.5 mm arises downstream of the second lens. A collimated component beam, albeit with a beam diameter of 10.2 mm, likewise arises if the first distance is changed to 118.3 mm and the second distance is changed to 75.5 mm.

There is a divergent or convergent laser beam if only one of the two lenses is moved. Accordingly, the beam diameter increases if the first distance is increased.

A more compact structure can additionally be realized here by virtue of the divergence of the hollow core fiber being positioned by a further lens, positioned in front of the first lens, for the purpose of increasing the divergence.

In a further preferred embodiment, the overall distance may be adjustable, with the diameter of the laser beam on the beam shaping element being able to be set by setting the overall distance.

By way of example, the beam shaping element may have an optically imaging property to this end. By way of example, the beam shaping element may be an axicon and have an at least sectionally spherically shaped side oriented counter to the beam propagation direction in order to influence the divergence angle of the output coupled laser beam during the passage through the axicon. However, it may also be the case that the beam shaping element is a diffractive optical element, with the lens effect also being written into the diffractive optical element such that this has both a lens effect and a beam shaping effect.

By way of example, the radius of the back side of the sphere of the axicon may be 75 mm. This may lead to a collimated laser beam which has a beam diameter of approximately 6.5 mm, with the distance of the output of the hollow core fiber from the beam shaping element corresponding to twice the radius and consequently being 150 mm. The laser beam is no longer collimated but divergent if the axicon is displaced, with the result that there is a change in the length of the focal zone caused by the beam shaping element. By way of example, the focal zone becomes shorter if the distance between the hollow core fiber and the axicon is decreased. Conversely, the focal zone becomes longer if the distance between the hollow core fiber and the axicon is increased.

In a further preferred embodiment, the first distance may be fixed, the overall distance may be adjustable and the diameter of the laser beam on the beam shaping element may be set by setting the overall distance.

By way of example, the divergent beam from the output of the hollow core fiber may be incident with for example NA=0.02 on the first lens. The latter has a first fixed distance from the output of the hollow core fiber. To adjust the length of the focal zone, the overall distance between the beam shaping element and the output of the hollow core fiber is varied.

By way of example, the first distance can be 41 mm, and the first focal length can be 56 mm. The overall distance may be 241 mm, with the result that the distance between the first lens and the beam shaping element is 200 mm. In this case, the beam diameter on the beam shaping element is 4 mm to a good approximation. If the overall distance is increased to 441 mm so that the distance between the beam shaping element and the first lens is 400 mm, then the beam diameter increases to approximately 6.3 mm.

The influence on the focal zone arising from the non-collimated beam can be compensated for by displacing the focusing optical unit in or counter to the beam propagation direction.

In a further preferred embodiment, the first distance may be adjustable and the overall distance may be fixed, and the diameter of the laser beam on the beam shaping element is set by setting the first distance.

In particular, this can produce a deliberately divergent component beam.

By way of example, the first lens can be displaced proceeding from a possible numerical aperture of the fiber with NA=0.02. The first distance of the first lens can be 56 mm, for example, with the first focal length likewise being 56 mm. The distance between the output of the hollow core fiber and the beam shaping element, which is to say the overall distance, can be 256 mm, with the result that a beam diameter of 2.38 mm arises on the beam shaping element. If the first distance is altered to 46 mm, then this increases the beam diameter on the beam shaping element to 3.54 mm. In particular, this makes it clear that if the first distance of the first lens from the output of the hollow core fiber is reduced then the beam diameter on the beam shaping element is increased and hence the length of the focal zone is likewise increased.

The influence on the focal zone arising from the non-collimated beam can be compensated for by displacing the focusing optical unit in or counter to the beam propagation direction.

In all of the above-described different configurations of the lens arrangement, it is preferable for the lens arrangement to be constructed using no more than two lenses, wherein one of these lenses may also already be integrated into the beam shaping element, for example in the form of a spherically shaped side oriented counter to the beam propagation direction or in the form of a diffractive microstructure on a surface, for example of the side oriented counter to the beam propagation direction, of the beam shaping element, and/or in the form of a diffractive microstructure in the volume of the beam shaping element. In this way, the structure of the lens arrangement allows the provision of a system which serves for processing a material, which is simple to adjust, and in which an adjustment of the length of the focal zone is rendered possible.

Preferred exemplary embodiments are described below with reference to the figures. In this case, elements that are the same, similar or have the same effect are provided with identical reference designations in the different figures, and a repeated description of these elements is omitted in some instances, in order to avoid redundancies.

In the following figures, only axicons are shown as beam shaping elements 6; however, these should be understood as being representative for further beam shaping elements, in particular for axicons, diffractive optical elements, generalized axicons or reflective axicons.

FIG. 1 schematically shows a first embodiment of a system 1 for processing a material 2 by means of ultrashort laser pulses from an ultrashort pulse laser 3.

The system 1 correspondingly comprises an ultrashort pulse laser 3, which makes available a laser beam 32 of ultrashort laser pulses 30. The laser beam 32 is input coupled into the input 40 of a hollow core fiber 4 via an input coupling optical unit 41. In this case, the hollow core fiber 4 can transmit the input coupled laser beam virtually without losses to the output 42 of the hollow core fiber 4. In particular, this makes it possible for the production of the laser beam 32 in the stationary ultrashort pulse laser 3 to occur spatially separated from the actual optical elements 6, 7, 8, 9, described below, of the system 1.

At the output 42 of the hollow core fiber 4, the laser beam 32 subtends a divergence angle α when output coupled from the hollow core fiber 4. A first lens 81 of a lens device 8 captures the laser beam 32 and reshapes the latter in accordance with the optical properties of the lens 81. This may mean that the divergence angle $\alpha$ of the laser beam 32 is adapted, for example reduced, by the first lens 81.

The laser beam 32 is subsequently incident on a beam splitter optical unit 9, with the laser beam 32 being split into a first component laser beam 32 and a second component laser beam 32'. The first component laser beam 32 is transmitted to a beam shaping element 6, which is configured to impose a quasi-non-diffractive beam shape with a focal zone 320 which is elongated in the beam propagation direction onto the laser beam 32. The quasi-non-diffractive laser beam 320 is subsequently transmitted through a focusing optical unit 7, with the focusing optical unit 7 being able to consist of an arrangement of lenses and in particular adjusting the length of the laser focus in this way. As a result, it is possible to determine in particular the penetration depth of the focal zone 322 of the laser beam 32.

In particular, the focusing optical unit 7 can be a telescope which images the non-diffractive beam, whereby the transverse diameter and the length in the beam propagation direction of the elongate focal zone 322 are able to be set. The position of the non-diffractive beam in the beam propagation direction in or on the workpiece is typically set by displacing the focusing optical unit 7 and the beam shaping element 6, with the laser beam 32 preferably being collimated in the process.

The material 2 at least partly absorbs the energy made available by the laser beam 32. In the process, the material 2 can be heated or photomechanically ablated by linear absorption or nonlinear absorption mechanisms, with the result that material processing occurs. Here, the shape of the processing region of the material corresponds in particular to the shape of the focal zone 322 of the quasi-non-diffractive laser beam 320.

In the present embodiment of FIG. 1, the lens device 8 comprises merely a first lens 81, which is arranged at a variable distance x1 in the beam direction downstream of the output of the hollow core fiber 42. In this case, the first lens 81 has a first focal length f1. The divergence angle $\alpha$ of the laser beam 32 can be set depending on the size of the first distance x1 between the first lens 81 and the output 42 of the hollow core fiber 4. In particular, the first lens 81 can be arranged downstream of the output 42 of the hollow core fiber 4 at the distance of the first focal length f1, with the result that the first lens 81 collimates the laser beam 32. As soon as the laser beam 32 is collimated, this means that the marginal rays of the laser beam 32 run parallel to one another, and so the laser beam 32 has a constant diameter D during the further propagation thereof from the first lens 81 to the beam shaping element 6.

The diameter D on the beam shaping element 6 determines the size of the focal zone 322, which is elongated in the beam propagation direction, of the laser beam 320 downstream of the beam shaping element 6. Thus, it is possible to influence the size of the focal zone 322, which is elongated in the beam propagation direction, of the laser beam 320 downstream of the beam shaping element 6 in particular by varying the diameter D of the laser beam 32 on the beam shaping element 6.

In particular, in this first embodiment, the laser beam 32 can be split at the beam splitter 9 into a first component laser beam 32, which is guided to the above-described beam shaping element 6, and a second component laser beam 32', which is transmitted to a further beam shaping element 6' and a further focusing optical unit 7'.

Figure 2:
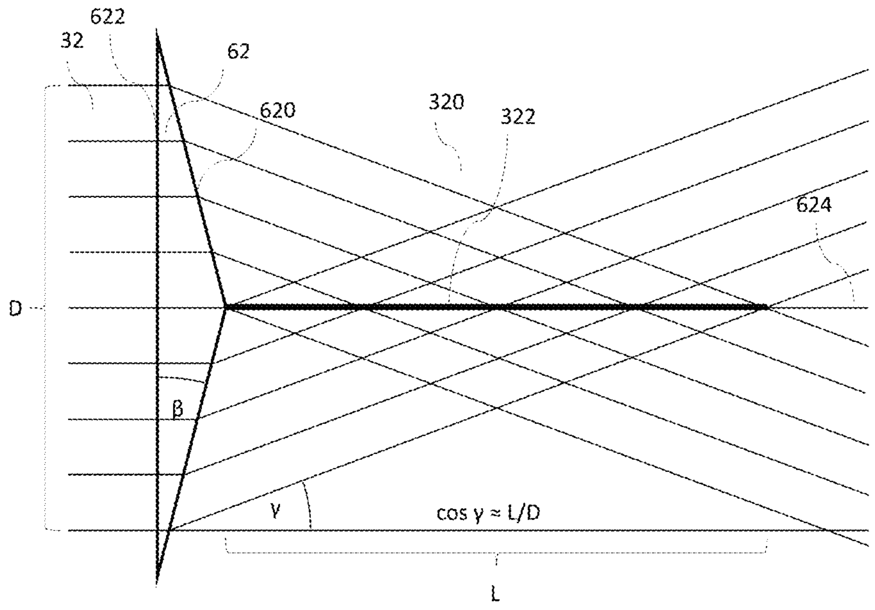
FIG. 2 shows a schematic illustration of an axicon and the generation of a focal zone which is elongated in the beam propagation direction according an embodiment.

FIG. 2 schematically shows how the beam diameter D at the beam shaping element 6 determines the length L of the focal zone 322 which is elongated in the beam propagation direction. An axicon 62 is depicted very schematically as a beam shaping element 6. The axicon 62 is a conically constructed optical element which in the present case has a flat back side 622 oriented counter to the beam propagation direction or facing the laser beam 32. The axicon 62 also has a conical lateral surface 620, with the cone including an angle $\beta$ with the flat back side of the axicon 62. In the case of perpendicular incidence on the flat back side of the axicon 62, the parallel laser beam 32 is guided onward through the material of the axicon without being refracted. However, the laser beam 32 is ultimately incident on the conically shaped side of the axicon 62, with the result that the laser beam 32 includes the angle $\beta$ with the surface normal of the axicon 62. According to Snell's law, the laser beam 32 is refracted accordingly during the transition of the laser beam from the axicon 62 into the surrounding medium. Since the transition of the laser beam 32 is from the optically denser medium, which is to say in the axicon 32, to air, for example, the laser beam 32 is refracted toward the optical axis. What follows from the rotationally symmetric structure of the axicon 62 is that the laser beam is refracted toward the optical axis 624 over the entire diameter of the axicon 62. What finally emerges from fundamental trigonometric considerations is that the length L of the zone in which an artificial intensity boost is produced by the axicon 62 is given by the angle of refraction $\gamma$ and the diameter D of the incident laser beam 320.

Figures 3A, 3B:
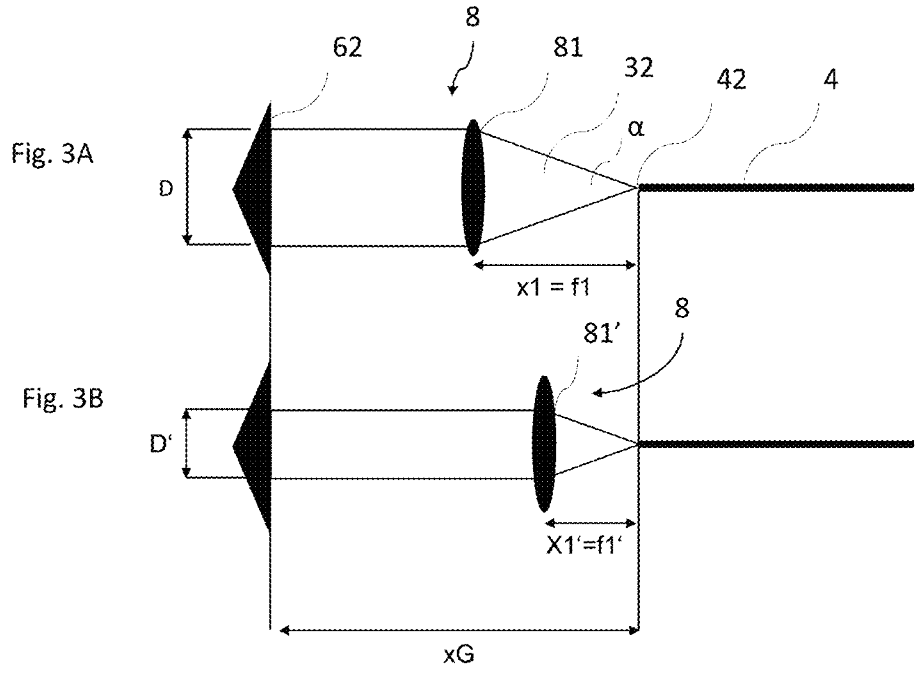
FIGS. 3A and 3B show a schematic illustration of the generation of different beam diameters according to some embodiments.

How the diameter of the laser beam on the beam shaping element 6 can be adjusted using the first embodiment of FIG. 1 is shown in FIGS. 3A and 3B in exemplary fashion.

A first lens 81 is arranged at a distance x1 from the output 42 of the hollow core fiber 4 in FIG. 3A. In this case, the first distance x1 corresponds to the first focal length f1 of the first lens 81. As a result, the divergent laser beam 32 emanating from the hollow core fiber 4 is reshaped into a parallel laser beam 32. The diameter D of the laser beam 32 at the beam shaping element 6 in this case emerges from the divergence angle $\alpha$ of the laser beam from the hollow core fiber 4 and from the focal length f1 of the first lens 81.

In FIG. 3B, the first lens 81 is replaced by a further first lens 81'. The further first lens 81' has a further focal length f1'. To shape a parallel laser beam 32 from the divergent laser beam 32 from the hollow core fiber 4, the further first lens 81' needs to be arranged at a further first distance x1' downstream of the output 42 of the hollow core fiber 4. Since the divergence of the laser beam downstream of the output 42 of the hollow core fiber 4 is independent of the focal length of the lens, another diameter D' of the laser beam 32 on the first lens 81' is produced by the different distances x1, x1'. Since the laser beam 32 runs parallel after the passage through the first lens 81', the diameter D' of the laser beam 32 on the beam shaping element 6 corresponds to the diameter D' of the laser beam 32 on the first lens 81'.

The length L of the elongate focal zone 322 is varied by varying the diameter D, D' of the laser beam 32 on the beam shaping element 6.

Figure 4:
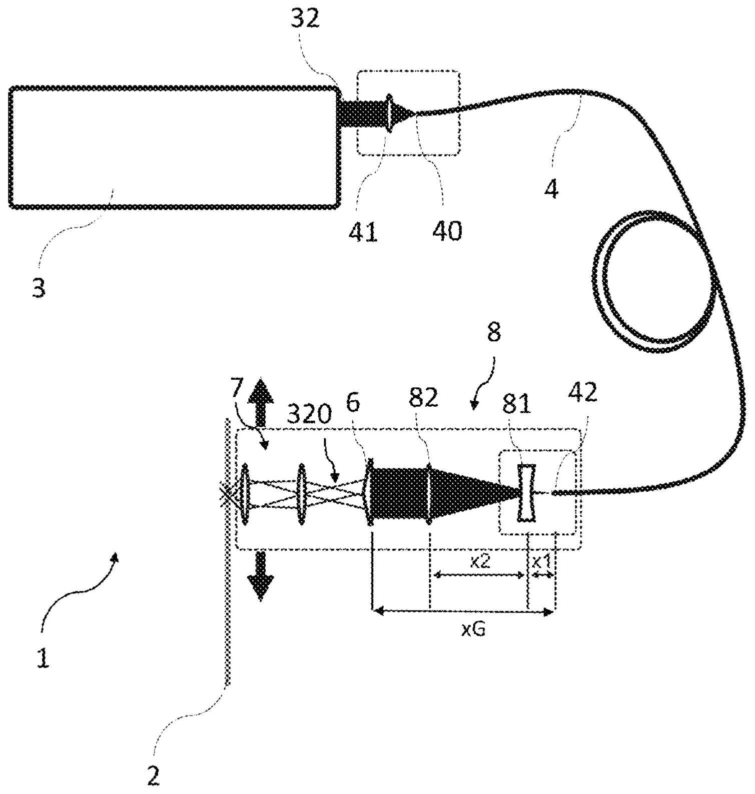
FIG. 4 shows a schematic structure according to an embodiment.

FIG. 4 shows a second embodiment of the system 1. In this case, a lens device 8 comprising two lenses 81, 82 is arranged downstream of the output 42 of the hollow core fiber 4 in the beam propagation direction. It is possible to vary both the distance of the first lens 81, which is arranged at a first distance x1 from the output 42 of the hollow core fiber 4, and the distance of the second lens 82, which is arranged at a second distance x2 from the first lens 81.

In this case, the first lens 81 is tasked with adjusting the divergence angle $\alpha$ of the laser beam 32 emerging from the output 42 of the hollow core fiber 4. In particular, the divergence angle $\alpha$ of the laser beam 32 can be varied downstream of the first lens 81 by virtue of adjusting the first distance x1 from the output 42 of the hollow core fiber 4. In said case, the second lens 82 is arranged at a distance x2 from the first lens 81 so that the focus of the second lens 82 coincides with the point from which, from the view of the second lens 82, the laser beam 32 appears to originate. As a result, a collimation of the laser beam 32 downstream of the second lens 82 is achieved in particular relative to the position of the first lens 81.

Figures 5A, 5B, 5C:
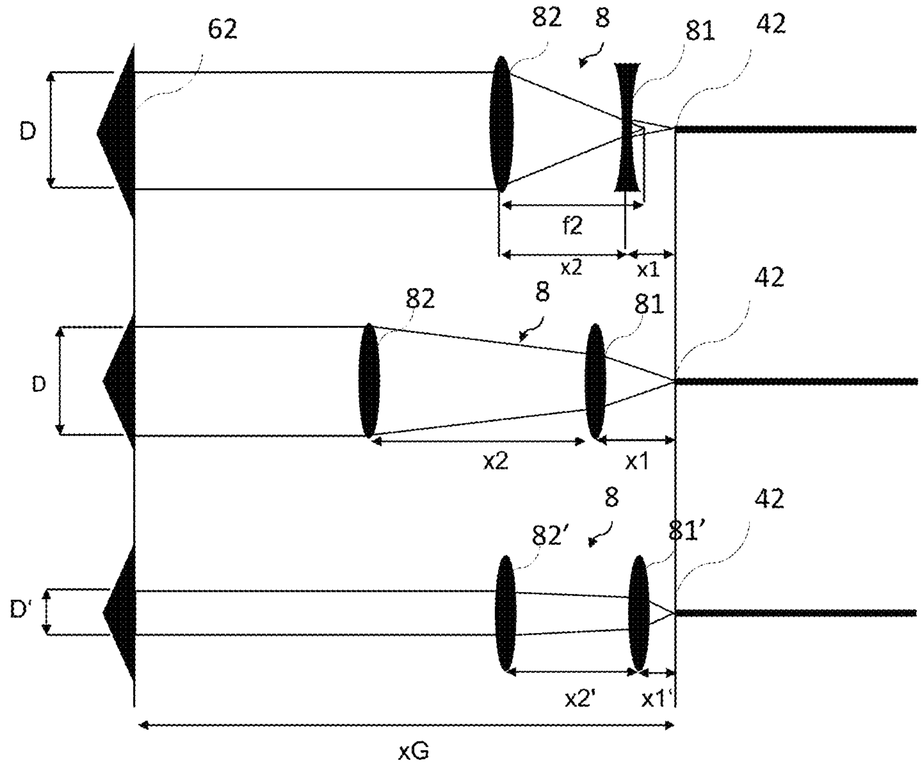
FIGS. 5A, 5B and 5C show a schematic illustration of the generation of different beam diameters according to some embodiments.

FIGS. 5A, 5B, 5C show various scenarios of the second embodiments.

In FIG. 5A, the laser beam 32 from the output 42 of the hollow core fiber 4 is incident on a first lens 81 of the lens device 8 after the distance x1, with the first lens 81 being a diverging lens. The diverging lens causes the divergence angle $\alpha$ of the laser beam 32 to be increased. As a result, a larger diameter D of the laser beam is obtained on the second lens 82 of the lens device 8 after a shorter distance x2. As a result, it is possible in particular for the laser beam 32 to already be collimated after a shorter overall distance xG, with the result that the optical installation length of the system overall can be reduced (not shown). In this case, the second lens 82 is arranged at a distance x2 from the first lens 81, with the distance x2 not being equal to the focal length F2. In particular, the distance x2 is chosen so that the focus of the lens 82 coincides with the point at which the laser beam 32 appears to originate from the view of the second lens 82. In particular, this point may be located between the diverging lens 81 and the output 42 of the hollow core fiber 4.

FIG. 5B shows the second embodiment in an example in which both lenses 81, 82 of the lens device 8 are converging lenses, which typically reduce the divergence angle $\alpha$ of the laser beam. In particular, the first lens 81 is arranged at the distance x1 from the output 42 of the hollow core fiber 4, and the second lens 82 is arranged at the distance x2 from the first lens 81. In this case, the first lens 81 does not collimate the laser beam 32. The laser beam 32 is only collimated by the second lens 82. As a result, it is possible in particular to precisely set the diameter D of the laser beam 32 on the beam shaping element 6.

FIG. 5C shows the situation in which the first lens 81 of the lens device 8 is arranged at a shorter distance x1' downstream of the output 42 of the hollow core fiber 4 in comparison with FIG. 5B. Since the distances x1 and x1' are different, the beam diameters D, D' produced on the first lenses 81, 81' are different. The second lenses 82, 82' collimate the laser beam 32 accordingly. Consequently, different beam diameters D, D' are produced on the beam shaping element 6 in FIGS. 5B and 5C as a result of the different illumination of the first and second lenses 81, 82.

Figure 6:
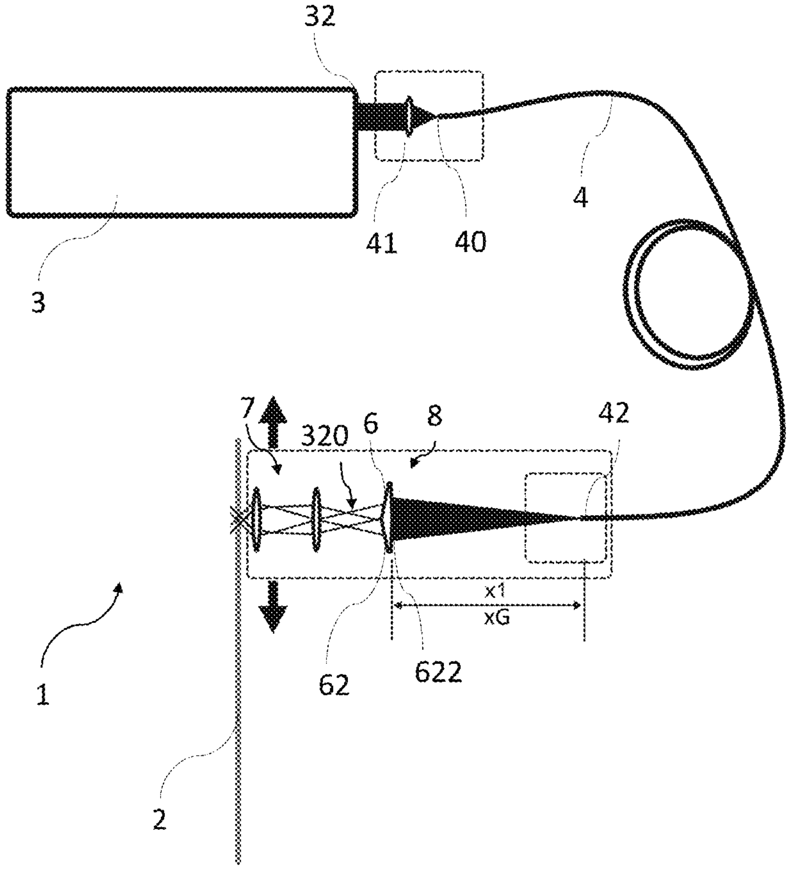
FIG. 6 shows a schematic structure according to an embodiment.

FIG. 6 shows a third embodiment, in which the beam shaping element 6 has a further optically imaging property. In particular, the embodiment shows an axicon 62 which has an at least sectionally spherical back side 622. In other words, the beam shaping element 6 also comprises a lens device 8 in the form of the spherical back side 622.

In this embodiment, the overall distance xG between the output 42 of the hollow core fiber 4 and the beam shaping element 6 can be varied in order to set the beam diameter D of the laser beam 32 on the beam shaping element 6. In this case, the beam diameter D is in particular specified directly by the divergence angle $\alpha$ of the hollow core fiber 4 and the overall distance xG. The sectionally spherically formed back side 622 of the axicon for example has the task of at least partly collimating the laser beam 32, or else of steering the latter into a suitable trajectory such that a subsequent focusing optical unit 7 can appropriately introduce the laser beam 320 into the material 2.

Figure 7:
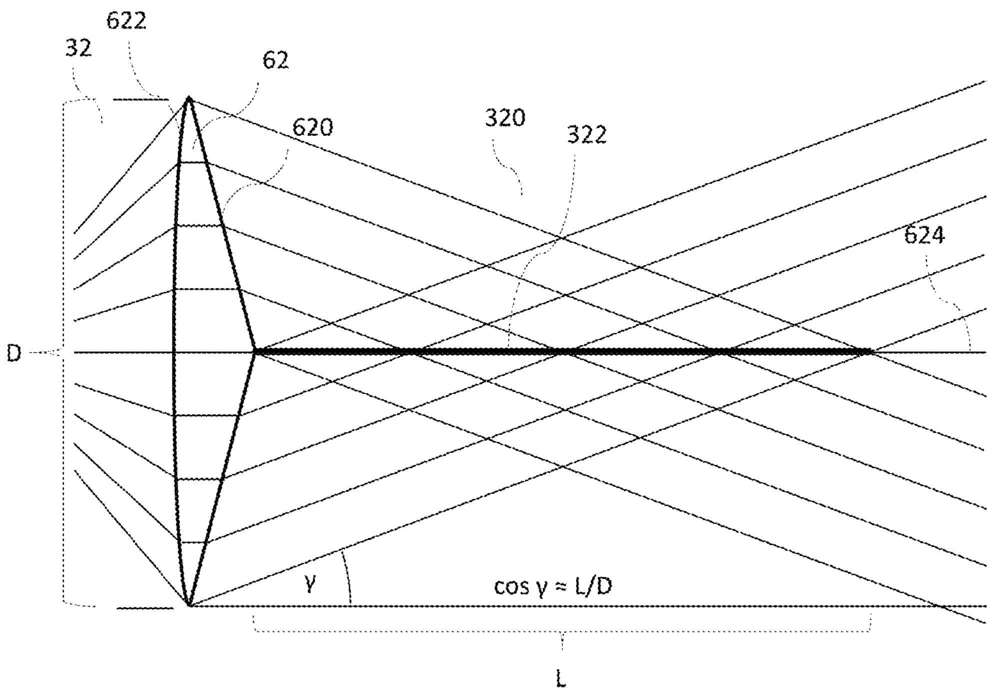
FIG. 7 shows a schematic illustration of an axicon with a sectionally spherical back side according to an embodiment.

FIG. 7 shows a schematic detailed drawing of an axicon 62, like from the exemplary embodiment of FIG. 6, with the sectionally spherical back side 622. The laser beam 32 subtending a divergence angle $\alpha$ is incident on the spherical back side 622 of the axicon 62. The spherical back side 622 allows a collimation of the laser beam 32 at a suitable distance xG within the medium of the axicon, with the result that an elongate focal zone 322 is produced on the optical axis 624 of the axicon 62.

Should the axicon 62 not be arranged at a distance x1, with the result that the rays do not run parallel within the axicon 62, the divergence of the laser beam 320 can be compensated for using an appropriate focusing optical unit 7.

For the purpose of forming an optically imaging property, the axicon 62 may alternatively or additionally have a diffractive microstructure (not shown here) on a surface, for example of the back side 622 of the axicon 62 oriented counter to the beam propagation direction, and/or a diffractive microstructure (not shown here) in the volume of the axicon 62. By means of the diffractive microstructure, it is possible for example to achieve the effects specified above in relation to the spherically shaped back side 622 of the axicon 62, and the diffractive microstructure can be provided instead of the spherical back side for example on a flat back side 622 as shown in FIG. 2.

Figure 8:
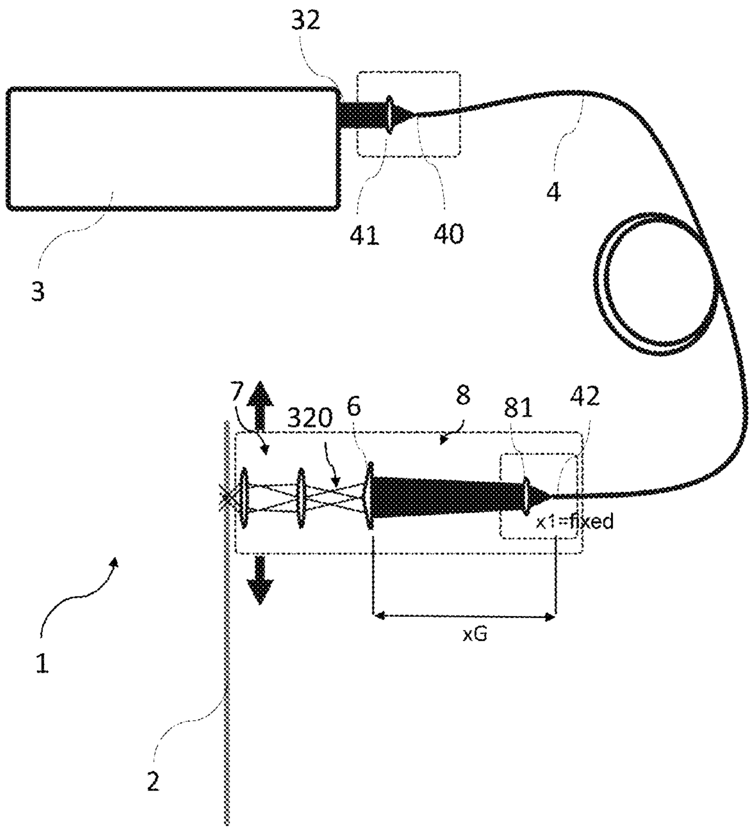
FIG. 8 shows a schematic structure according to an embodiment.

FIG. 8 shows a fourth embodiment in which the first distance x1 of the first lens 82 is fixed and the overall distance xG between the beam shaping element 6 and the output 42 of the hollow core fiber 4 can be adjusted.

The laser beam 32 subtending the divergence angle $\alpha$ is incident on the first lens 81. In this case, the first lens 81 can be a converging lens, for example, which at least partly collimates the laser beam 32. In other words, it is possible to effectively carry out a "pre-collimation" of the divergent laser beam 32, for example if the divergence angle $\alpha$ is too large for the respective structure. Consequently, the diameter D of the laser beam 32 on the beam shaping element 6 can be varied, and hence the length L of the focal zone can be varied, by way of the distance between the first lens 81 and the beam shaping element 6.

Figure 9:
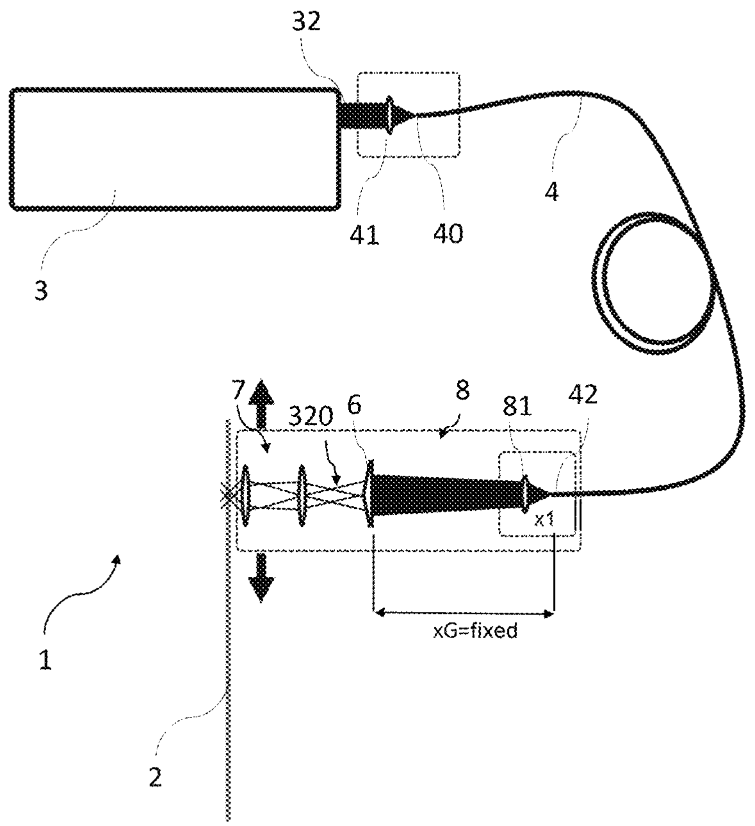
FIG. 9 shows a schematic structure according to an embodiment.

FIG. 9 shows a fifth embodiment in which the lens device 8 comprises merely a first lens 81 which is arranged at an adjustable distance x1 from the output 42 of the hollow core fiber 4. The overall distance xG between the beam shaping element 6 and the output 42 of the hollow core fiber 4 is fixed in this embodiment. Accordingly, the diameter D of the laser beam 32 on the beam shaping element 6 can be set by virtue of moving the first lens 81 between the beam shaping element 6 and the output 42 of the hollow core fiber 4. As a result, it is possible to adjust the diameter D of the laser beam 32 on the beam shaping element 6. A remaining residual divergence of the beam 32 downstream of the beam shaping element 6 can be compensated for by a suitable arrangement of the focusing optical unit 7.

Further optical elements, for example filters, stops, beam splitters, wedge plates, birefringent lenses, can be arranged downstream of the axicon in the beam path in all embodiments shown. Moreover, the first lens of the downstream telescope shown in the drawings may also be integrated into the axicon.

Figure 10A:
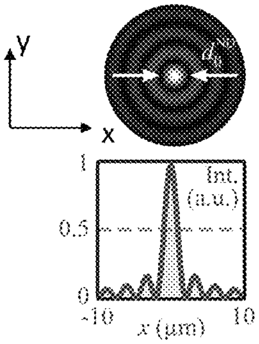
FIGS. 10A, 10B, 10C, and 10D show a schematic illustration of quasi-non-diffractive beams according to some embodiments.

FIG. 10A shows the intensity profile of a quasi-non-diffractive laser beam 320. In particular, the quasi-non-diffractive beam 320 is a Bessel-Gaussian beam. The Bessel- Gaussian beam has a radial symmetry in the transverse focal zone in the x-y plane, such that the intensity of the laser beam depends only on the distance with respect to the optical axis.

Figure 10B:
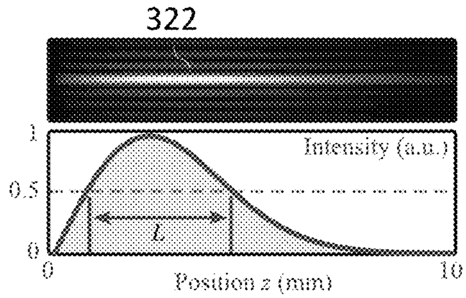

FIG. 10B shows the longitudinal focal zone in the beam propagation direction. The focal zone 322 is elongated in the beam propagation direction and has a size of approximately 3 mm. Hence, the focal zone 322 in the propagation direction is substantially larger than the transverse focal zone in the x-y plane.

Figure 10C:
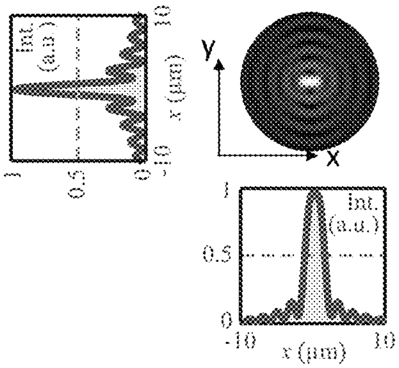

FIG. 10C shows, in a manner analogous to FIG. 10A, a quasi-non-diffractive beam whose transverse focal zone is non-radially symmetric. In particular, the transverse focal zone appears stretched in the y-direction, and is virtually elliptical, with the result that there is a long and a short principal axis of the transverse focal zone in this case; in the example shown, the long principal axis has an extent of approximately 3 μm.

Figure 10D:
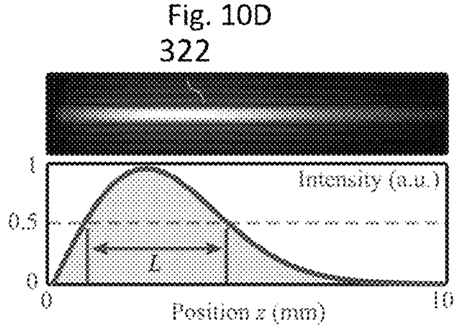

FIG. 10D shows a cross section in the x-z plane through the longitudinal focal zone of the quasi-non-diffractive beam. The extent of the focal zone along the z-axis is approximately 3 mm. Accordingly, the quasi-non-diffractive beam also has a focal zone 322 which is elongated in the beam propagation direction.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

LIST OF REFERENCE DESIGNATIONS

1 System
2 Material
3 Laser
30 Laser pulses
32 Laser beam
320 Non-diffractive beam
322 Elongate focal region
4 Hollow core fiber
40 Input of the hollow core fiber
41 Input coupling optical unit
42 Output of the hollow core fiber
6 Beam shaping element
62 Axicon
620 Lateral surface
622 Back side
624 Optical axis
7 Focusing optical unit
8 Lens device
81 First lens
82 Second lens
83 Further lens
9 Beam splitter optical unit
α Divergence angle
x1 First distance
x2 Second distance
xG Overall distance
L Length of the focal zone
D Diameter of the laser beam
d Diameter of the focal zone
f1 First focal length
f2 Second focal length

The invention claimed is:

1. A system for processing a material by using ultrashort laser pulses from an ultrashort pulse laser, the system comprising:

an ultrashort pulse laser for producing the ultrashort laser pulses and for providing a laser beam, a hollow core fiber configured to transport the laser beam to an output of the hollow core fiber, and an input coupling optical unit configured to input couple the laser beam into an input of the hollow core fiber, wherein the output of the hollow core fiber is configured to output couple the laser beam from the hollow core fiber, wherein the output coupled laser beam subtends a divergence angle, a lens device, on which the laser beam subtending the divergence angle and output coupled from the hollow core fiber is incident, a beam shaping element, on which the laser beam emerging from the lens device is incident, and a focusing optical unit, wherein the lens device is configured to adjust a beam diameter of the laser beam on the beam shaping element from a first beam diameter to a second beam diameter different from the first beam diameter, wherein the beam shaping element is configured to impose upon the laser beam, upstream or downstream of the focusing optical unit, a quasi-non-diffractive beam shape with a focal zone that is elongated in a beam propagation direction, and wherein the focusing optical unit is configured to set a penetration depth of the focal zone in or on the material.

2. The system as claimed in claim 1, wherein an optical path distance of the output of the hollow core fiber from the beam shaping element is adjustable in order to set an illumination of an input of the beam shaping element and hence set a length of the focal zone that is elongated in the beam propagation direction.

3. The system as claimed in claim 1, wherein a duration of the laser pulses is between 0.01 ps and 100 ps.

4. The system as claimed in claim 1, wherein the beam shaping element comprises an axicon or a diffractive optical element, wherein a length of the focal zone that is elongated in the beam propagation direction is determined by the beam diameter of the laser beam on an input of the beam shaping element.

5. The system as claimed in claim 1, wherein the beam shaping element forms at least a part of the lens device.

6. The system as claimed in claim 5, wherein an optical path distance from the output of the hollow core fiber to the beam shaping element is adjustable and the beam diameter of the laser beam on the beam shaping element is set by setting the optical path distance.

7. The system as claimed in claim 1, wherein the beam shaping element comprises a sectionally spherical shaped side that is oriented counter to the beam propagation direction, or a diffractive microstructure on a side of the beam shaping element that is oriented counter to the beam propagation direction, or a diffractive microstructure in a volume of the beam shaping element.

8. The system as claimed in claim 1, wherein the lens device is arranged between the output of the hollow core fiber and an input of the beam shaping element at a first optical path distance, and the lens device comprises a first lens having a first focal length and positioned at a first distance from the output of the hollow core fiber, with the first distance being fixed or being able to be adjusted.

9. The system as claimed in claim 8, wherein the first distance is fixed, and an optical path distance from the output of the hollow core fiber to the beam shaping element is adjustable, the beam diameter of the laser beam on the beam shaping element is set by setting the optical path distance.

10. The system as claimed in claim 8, wherein the first distance is adjustable and an optical path distance from the output of the hollow core fiber to the beam shaping element is fixed, the beam diameter of the laser beam on the beam shaping element is set by setting the first distance.

11. The system as claimed in claim 8, further comprising a beam splitter optical unit arranged downstream of the first lens in the beam propagation direction and configured to deflect a portion of the laser beam away from the beam propagation direction.

12. The system as claimed in claim 11, wherein the deflected portion of the laser beam is rendered accessible to a further beam shaping element and a further focusing optical unit.

13. A system for processing a material by using ultrashort laser pulses from an ultrashort pulse laser, the system comprising:

an ultrashort pulse laser for producing the ultrashort laser pulses and for providing a laser beam, a hollow core fiber configured to transport the laser beam to an output of the hollow core fiber, an input coupling optical unit configured to input couple the laser beam into an input of the hollow core fiber, wherein the output of the hollow core fiber is configured to output couple the laser beam from the hollow core fiber, wherein the output coupled laser beam subtends a divergence angle, a lens device, on which the laser beam subtending the divergence angle and output coupled from the hollow core fiber is incident, a beam shaping element, on which the laser beam emerging from the lens device is incident, and a focusing optical unit, wherein the lens device is arranged between the output of the hollow core fiber and an input of the beam shaping element, wherein the lens device is configured to adjust a beam diameter of the laser beam on the beam shaping element, the lens device comprising a first lens having a first focal length and positioned at a first distance from the output of the hollow core fiber, and a second lens positioned at a second distance from the first lens downstream of the first lens in a beam propagation direction, wherein the first distance is adjustable, and the second distance is adjustable and is set so that a focus of the second lens coincides with a point from which the laser beam appears to originate, and the second lens is configured to collimate the laser beam, with the beam diameter of the laser beam on the beam shaping element being set by setting the first distance and the second distance, wherein the beam shaping element is configured to impose upon the laser beam, upstream or downstream of the focusing optical unit, a quasi-non-diffractive beam shape with a focal zone that is elongated in the beam propagation direction, and wherein the focusing optical unit is configured to set a penetration depth of the focal zone in or on the material.

14. The system as claimed in claim 13, wherein the first lens is a diverging lens.

* * * * *